US010186968B2

(12) United States Patent
Guan et al.

(10) Patent No.: US 10,186,968 B2
(45) Date of Patent: Jan. 22, 2019

(54) DIRECT CURRENT CONVERTER (71) Applicant: BOE TECHNOLOGY GROUP CO., LTD., Beijing (CN)

(72) Inventors: Enhui Guan, Beijing (CN); Shuo Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/520,207

(22) PCT Filed: Oct. 27, 2016

(86) PCT No.: PCT/CN2016/103480
§ 371 (c)(1),
(2) Date: Apr. 19, 2017

(87) PCT Pub. No.: WO2017/140119
PCT Pub. Date: Aug. 24, 2017

(65) Prior Publication Data
US 2018/0091053 A1 Mar. 29, 2018

(30) Foreign Application Priority Data
Feb. 19, 2016 (CN) .......................... 2016 1 0095181

(51) Int. Cl.
G05F 1/40 (2006.01)
H02M 3/158 (2006.01)
(Continued)

(52) U.S. Cl.
CPC ............. H02M 3/158 (2013.01); H02M 3/07 (2013.01); H02M 3/139 (2013.01); H02M 3/142 (2013.01); H02M 3/28 (2013.01)

(58) Field of Classification Search
CPC ......... H02M 3/1582; H02M 2001/009; H02M 1/10; H02M 2003/1586; H02J 9/062; Y10T 307/625
(Continued)

(56) References Cited

U.S. PATENT DOCUMENTS 5,059,887 A * 10/1991 Iida ........................ H02M 3/142
323/222
7,276,886 B2 * 10/2007 Kinder ................ H02M 3/1582
323/259
(Continued)

FOREIGN PATENT DOCUMENTS

CN 103986325 * 8/2013
CN 103490619 A 1/2014
(Continued)

OTHER PUBLICATIONS

International Search Report & Written Opinion dated Feb. 6, 2017, regarding PCT/CN2016/103480.
(Continued)

Primary Examiner — Rajnikant Patel
(74) Attorney, Agent, or Firm — Intellectual Valley Law, P.C.

(57) ABSTRACT

The present application discloses a direct current (DC) converter including a voltage divider for dividing a voltage provided by a DC voltage source, having a positive DC voltage input terminal, a negative DC voltage input terminal, and a divided voltage output terminal; a conversion circuit having a first switch, a second switch, an inductor unit, a first unidirectional conductor, and a second unidirectional conductor; a positive converted voltage output terminal; and a negative converted voltage output terminal.

19 Claims, 6 Drawing Sheets (51) Int. Cl.
  *H02M 3/07* (2006.01)
  *H02M 3/139* (2006.01)
  *H02M 3/142* (2006.01)
  *H02M 3/28* (2006.01)

(58) Field of Classification Search
  USPC .... 323/222, 224, 235, 282, 351; 307/62–66; 363/84–86, 89, 124, 125
  See application file for complete search history.

(56) References Cited

U.S. PATENT DOCUMENTS

| | | | | |
|---|---|---|---|---|
| 7,276,889 | B2 * | 10/2007 | Gan | G05F 3/30 |
| | | | | 323/284 |
| 7,705,489 | B2 * | 4/2010 | Nielsen | H02J 9/062 |
| | | | | 307/66 |
| 9,564,775 | B2 * | 2/2017 | Liu | H02J 9/04 |
| 2011/0227889 | A1 * | 9/2011 | Choi | G09G 3/3233 |
| | | | | 345/209 |

FOREIGN PATENT DOCUMENTS

| | | |
|---|---|---|
| CN | 103986325 A | 8/2014 |
| CN | 104967313 A | 10/2015 |
| CN | 205666755 U | 10/2016 |
| EP | 2151911 A1 | 2/2010 |
| JP | 2006340432 A | 12/2006 |

OTHER PUBLICATIONS

First Office Action in the Chinese Patent Application No. 201610095181.X, dated Nov. 15, 2016; English translation attached.
Second Office Action in the Chinese Patent Application No. 201610095181.X, dated Feb. 4, 2017; English translation attached.
Chapter 3.2 of Thesis entitled "Study on High Step-up Three-level Zeta Converter", Guan Enhui, Harbin Institute of Technology, dated Feb. 15, 2016; English translation attached.
Chapter 7-4-1.6 of China Electrical Engineering Canon; Zhaoming Qian et al., dated Jun. 30, 2009; English translation attached.
The Decision of Rejection in the Chinese Patent Application No. 201610095181.X, dated May 22, 2017; English translation attached.

* cited by examiner

DIRECT CURRENT CONVERTER

CROSS-REFERENCE TO RELATED APPLICATION

This application is a national stage application under 35 U.S.C. § 371 of International Application No. PCT/CN2016/103480 filed Oct. 27, 2016, which claims priority to Chinese Patent Application No. 201610095181.X, filed Feb. 19, 2016, the contents of which are incorporated by reference in the entirety.

TECHNICAL FIELD

The present invention relates to direct current conversion technology, more particularly, to a direct current converter.

BACKGROUND

High voltage conversion ratio DC-DC converters have found a wide range of applications in fields as diverse as electric cars, renewable energy systems, and uninterruptible power supply systems. In conventional DC-DC converters, the conversion gain may be enhanced by adopting a duty cycle having an extremum value, or by incorporating a transformer component into the DC-DC converter. However, the efficiency of the DC-DC converter may be adversely affected when a duty cycle greater than 0.9 or less than 0.1 is used. Moreover, the addition of the transformer increases circuit size and manufacturing costs.

SUMMARY

In one aspect, the present invention provides a direct current (DC) converter comprising a voltage divider for dividing a voltage provided by a DC voltage source, having a positive DC voltage input terminal, a negative DC voltage input terminal, and a divided voltage output terminal; a conversion circuit having a first switch, a second switch, an inductor unit, a first unidirectional conductor, and a second unidirectional conductor; a positive converted voltage output terminal; and a negative converted voltage output terminal; wherein the first switch is coupled between the positive DC voltage input terminal and the positive converted voltage output terminal; the second switch is coupled between the negative DC voltage input terminal and the negative converted voltage output terminal; the first unidirectional conductor is coupled between the divided voltage output terminal and the positive converted voltage output terminal; the second unidirectional conductor is coupled between the divided voltage output terminal and the negative converted voltage output terminal; the inductor unit is coupled between the positive converted voltage output terminal and the negative converted voltage output terminal, the inductor unit comprises a controller and at least two switchable inductors; and the controller is configured to control the at least two switchable inductors to be coupled in parallel to each other between the positive converted voltage output terminal and the negative converted voltage output terminal upon the first switch and the second switch are both turned on; and configured to control the at least two switchable inductors to be coupled in series between the positive converted voltage output terminal and the negative converted voltage output terminal upon one of the first switch and the second switch is turned on and the other is turned off.

Optionally, a control terminal of the first switch is configured to receive a first switch control signal, and a control terminal of the second switch is configured to receive a second switch control signal; the first switch control signal and the second switch control signal having a substantially the same duty cycle and a substantially the same frequency; the first switch control signal and the second switch control signal are out of phase by approximately 180 degree to each other; and the duty cycle of the first switch control signal and the second switch control signal is larger than approximately 0.5.

Optionally, the first unidirectional conductor is configured to direct a current from the divided voltage output terminal to the positive converted voltage output terminal; and the second unidirectional conductor is configured to direct a current from the negative converted voltage output terminal to the divided voltage output terminal.

Optionally, the first unidirectional conductor comprises a first clamping diode having an anode coupled to the divided voltage output terminal and a cathode coupled to the positive converted voltage output terminal; and the second unidirectional conductor comprises a second clamping diode having an anode coupled to the negative converted voltage output terminal and a cathode coupled to the divided voltage output terminal.

Optionally, the inductor unit comprises an inductor module having a first switchable inductor, a second switchable inductor, a first switching diode, a second switching diode, and a third switching diode; a first terminal of the first switchable inductor is coupled to the positive converted voltage output terminal, a second terminal of the first switchable inductor is coupled to an anode of the first switching diode; a cathode of the first switching diode is coupled to the negative converted voltage output terminal; an anode of the second switching diode is coupled to the positive converted voltage output terminal, a cathode of the second switching diode is coupled to a first terminal of the second switchable inductor; a second terminal of the second switchable inductor is coupled to the negative converted voltage output terminal; and an anode of the third switching diode is coupled to an anode of the first switching diode, a cathode of the third switching diode is coupled to a cathode of the second switching diode.

Optionally, the inductor unit comprises at least two inductor modules coupled in parallel to each other, and one or more connecting diode, each of which between two adjacent inductor modules; and an anode of each connecting diode is coupled to the negative converted voltage output terminal, a cathode of each coupled diode is coupled to the positive converted output terminal.

Optionally, the direct current converter further comprises a filter circuit configured to filter converted voltage between the positive converted voltage output terminal and the negative converted voltage output terminal, wherein a first terminal of the filter circuit is coupled to the positive converted voltage output terminal, a second terminal of the filter circuit is coupled to the negative converted voltage output terminal.

Optionally, the filter circuit comprises a filter inductor, a first filter capacitor, and a filter resistor; a first terminal of the filter inductor is coupled to the positive converted voltage output terminal, and a second terminal of the filter inductor is coupled to a first terminal of the filter resistor; a second terminal of the filter resistor is coupled to the negative convened voltage output terminal; and a first terminal of the first filter capacitor is coupled to a second terminal of the filter inductor, and a second terminal of the first filter capacitor is coupled to the negative converted voltage output terminal.

Optionally, the filter circuit further comprises a second filter capacitor and a third filter capacitor; a first terminal of the second filter capacitor is coupled to a first terminal of the inductor unit, and a second terminal of the second filter capacitor is coupled to the positive converted voltage output terminal; and a first terminal of the third filter capacitor is coupled to a second terminal of the inductor unit, and a second terminal of the third filter capacitor is coupled to the negative converted voltage output terminal.

Optionally, the voltage divider comprises a first voltage division capacitor and a second voltage division capacitor; a first terminal of the first voltage division capacitor is coupled to the positive DC voltage input terminal, and a second terminal of the first voltage division capacitor is coupled to the divided voltage output terminal; and a first terminal of the second voltage division capacitor is coupled to the divided voltage output terminal, and a second terminal of the second voltage division capacitor is coupled to the negative DC voltage input terminal.

Optionally, the first voltage division capacitor and the second voltage division capacitor have a substantially the same capacitance.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Figure 1:
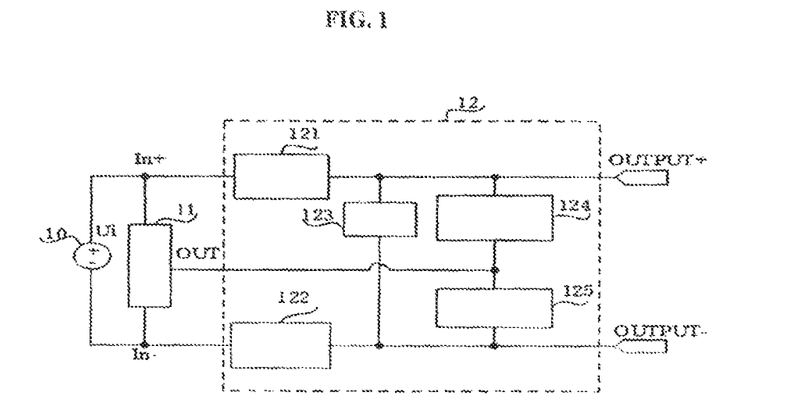
FIG. 1 is a diagram illustrating the structure of a DC converter in some embodiments.

FIG. 1 is a diagram illustrating the structure of a DC converter in some embodiments. Referring to FIG. 1, the DC converter in the embodiment includes a voltage divider 11 and a conversion circuit 12. The voltage divider 11 divides a DC voltage Ui provided by a DC voltage source 10. The voltage divider 11 includes three terminals, a positive DC voltage input terminal In+, a negative DC voltage input terminal In−, and a divided voltage output terminal OUT.

The conversion circuit 12 includes a first switch 121, a second switch 122, an inductor 123, a first unidirectional conductor 124, and a second unidirectional conductor 125. The first switch 121 is coupled between the positive DC voltage input terminal In+ and a positive converted voltage output terminal OUTPUT+. The second switch 122 is coupled between the negative DC voltage input terminal In− and a negative converted voltage output terminal OUTPUT−.

The first unidirectional conductor 124 is coupled between the divided voltage output terminal OUT and the positive converted voltage output terminal OUTPUT+. The second unidirectional conductor 125 is coupled between the divided voltage output terminal OUT and the negative converted voltage output terminal OUTPUT−.

The inductor unit 123 is coupled between the positive converted voltage output terminal OUTPUT+ and the negative converted voltage output terminal OUTPUT−.

Figure 5A:
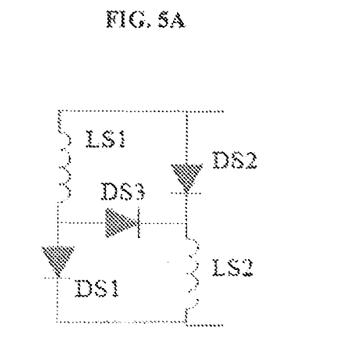
FIG. 5A is a diagram illustrating the structure of an inductor unit in a DC converter in some embodiments.

The inductor unit 123 includes a controller and at least two switchable inductors (see, e.g., FIGS. 5A-SC and 6A-6C). The controller is configured to control the at least two switchable inductors to be coupled in parallel between the positive convened voltage output terminal OUTPUT+ and the negative convened voltage output terminal OUTPUT− when the first switch 121 and the second switch 122 are both turned on. The controller is configured to control the at least two switchable inductors to be coupled in series between the positive converted voltage output terminal OUTPUT+ and the negative converted voltage output terminal OUTPUT− when one of the first switch 121 and the second switch 122 is turned on and the other is turned off (e.g., when the first switch 121 is turned on and the second switch 122 is turned off, or when the second switch 122 is turned on and the first switch 121 is turned off).

In a first operation mode, the first switch 121 and the second switch 122 are both turned on, the present DC converter charges the at least two switchable inductors in the inductor unit 123. In the first operation mode, the at least two switchable inductors are coupled in parallel to each other. The charging voltage between two terminals of the switchable inductors is the DC voltage Ui provided by a DC voltage source 10. In a second operation mode, one of the first switch 121 and the second switch 122 is turned on and the other is turned off (e.g., when the first switch 121 is turned on and the second switch 122 is turned off, or when the second switch 122 is turned on and the first switch 121 is turned off), the at least two switchable inductors in the inductor unit 123 are discharged. In the second operation mode, the at least two switchable inductors are coupled in series. The discharging voltage between two terminals of the switchable inductors is Ui/N, wherein N is the number of switchable inductors in the inductor unit 123. Accordingly, the discharging current of the present DC converter is approximately 1/N of that in a conventional DC converter (N is an integer≥2). The lower discharging rate results in a higher conversion gain in the present DC converter as compared to the conventional DC converter. Moreover, a gate voltage applied to a switching transistor in the switch of the present DC converter is smaller than that in the conventional DC converter, the switching transistor is subject to less stress during operation.

In some embodiments, the inductor unit has a cascaded switchable inductor structure. The present DC converter applies the cascaded structure in a three-level DC-DC converter. The resulting three-level DC-DC converter has a higher conversion ratio, and at the same time is less demanding on the switch's ability to withstand stress.

In conventional DC converters, the voltage conversion ratio may be improved by using switchable inductor and switchable capacitor. In the present DC converter, the voltage conversion ratio is not strictly limited by the topological structure of the circuit. As a result, the present DC converter may be made more compact and cost effectively.

Figure 2:
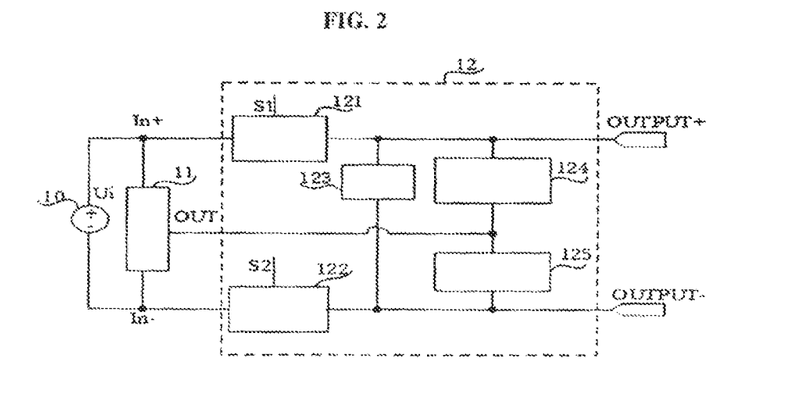
FIG. 2 is a diagram illustrating the structure of a DC converter having received S1 and S2 signals in some embodiments. 10018i

FIG. 2 is a diagram illustrating the structure of a DC converter having received S1 and S2 signals in some embodiments. Referring to FIG. 2, a control terminal of the first switch 121 is configured to receive a first switch control signal S1, and a control terminal of the second switch 122 is configured to receive a second switch control signal S2.

Figure 3:
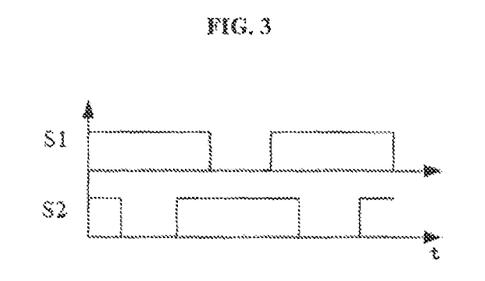
FIG. 3 is a waveform diagram of S1 and S2 signals in some embodiments.

FIG. 3 is a waveform diagram of S1 and S2 signals in some embodiments. Referring to FIG. 3, the first switch control signal S1 and the second switch control signal S2 have a substantially the same duty cycle and a substantially the same frequency. The first switch control signal S1 and the second switch control signal S2 are out of phase by approximately 180 degree to each other. The duty cycle of the first switch control signal S1 and the second switch control signal S2 is larger than approximately 0.5.

In some embodiments, the first switch 121 and the second switch 122 are both switching transistors. Optionally, the first switch and the second switch are both n-type switching transistors, the first switch is turned on when the S1 is a high voltage level signal, and the second switch is turned on when the S2 is a high voltage level signal. As shown in FIG. 3, due to the duty cycle and frequency of S1 and S2, at least one of S1 and S2 is a high voltage level signal. There is no period in which both S1 and S2 are low voltage signals. Optionally, the first switch and the second switch are both p-type switching transistors, the first switch is turned on when the S1 is a low voltage level signal, and the second switch is turned on when the S2 is a low voltage level signal.

In some embodiments, the conduction phases of the first switch 121 and the second switch 122 are out of phase by approximately 180 degree, the first switch control signal S1 and the second switch control signal S2 have a substantially the same duty cycle and a substantially the same frequency, and the duty cycle of the first switch control signal S1 and the second switch control signal S2 is larger than approximately 0.5.

In some embodiments, the first unidirectional conductor 124 is configured to direct a current from the divided voltage output terminal OUT to the positive converted voltage output terminal OUTPUT−, and the second unidirectional conductor 125 is configured to direct a current from the negative converted voltage output terminal OUTPUT− to the divided voltage output terminal OUT.

Figure 4:
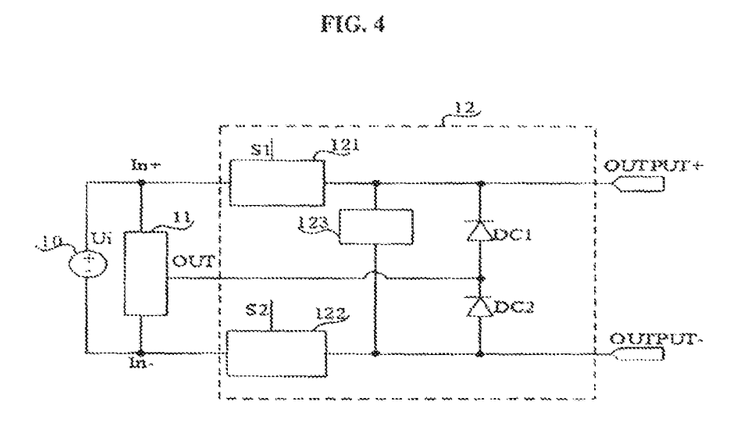
FIG. 4 is a diagram illustrating the structure of a DC converter in some embodiments.

FIG. 4 is a diagram illustrating the structure of a DC converter in some embodiments. Referring to FIG. 4, the first unidirectional conductor 124 includes a first clamping diode DC1 having an anode coupled to the divided voltage output terminal OUT and a cathode coupled to the positive converted voltage output terminal OUTPUT+. The second unidirectional conductor 125 includes a second clamping diode DC2 having an anode coupled to the negative converted voltage output terminal OUTPUT− and a cathode coupled to the divided voltage output terminal OUT.

FIG. 5A is a diagram illustrating the structure of an inductor unit in a DC converter in some embodiments. Referring to FIG. 5A, the inductor unit includes an inductor module having a first switchable inductor LS1, a second switchable inductor LS2, a first switching diode DS1, a second switching diode DS2, and a third switching diode DS3. DS1, DS2, and DS3 are part of the controller.

Optionally, a first terminal of the first switchable inductor LS1 is coupled to the positive converted voltage output terminal OUTPUT+, a second terminal of the first switchable inductor LS1 is coupled to an anode of the first switching diode DS1.

Optionally, a cathode of the first switching diode DS1 is coupled to the negative converted voltage output terminal OUTPUT−.

Optionally, an anode of the second switching diode DS2 is coupled to the positive converted voltage output terminal OUTPUT+, a cathode of the second switching diode DS2 is coupled to a first terminal of the second switchable inductor LS2.

Optionally, a second terminal of the second switchable inductor LS2 is coupled to the negative converted voltage output terminal OUTPUT−.

Optionally, an anode of the third switching diode LS3 is coupled to an anode of the first switching diode DS1, a cathode of the third switching diode DS3 is coupled to a cathode of the second switching diode DS2.

Figure 5B:
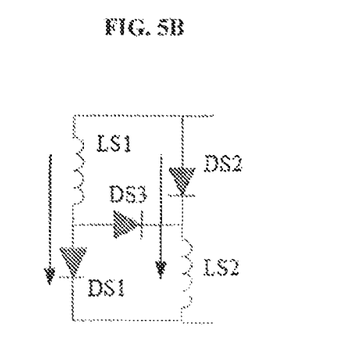
FIG. 5B illustrates the current direction when the inductor unit of FIG. 5A is being charged.

FIG. 5B illustrates the current direction when the inductor unit of FIG. 5A is being charged. Referring to FIG. 5B, when the first switch and the second switch are both turned on, LS1 and LS2 are coupled in parallel to each other. The first current path flows through LS1 and DS1 coupled in series, and the second current path flows through DS2 and LS2 coupled in series.

Figure 5C:
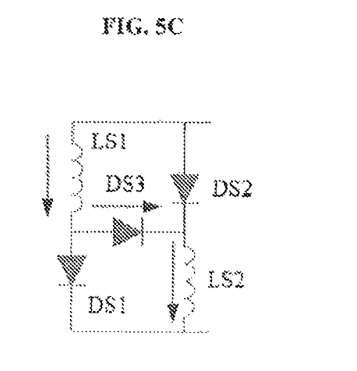
FIG. 5C illustrates the current direction when the inductor unit of FIG. 5A is being discharged.

FIG. 5C illustrates the current direction when the inductor unit of FIG. 5A is being discharged. Referring to FIG. 5C, when one of the first switch and the second switch is turned on and the other is turned off (e.g., when the first switch is turned on and the second switch is turned off, or when the second switch is turned on and the first switch is turned off), the current path sequentially flows through LS1, DS3, and LS2. LS1 and LS2 are coupled in series.

In some embodiments, the inductor unit includes at least two inductor modules coupled in parallel to each other. By having multiple inductor modules, a greater number of switchable inductors may be included in the inductor unit, further decreasing the discharging rate of the inductor unit and in turn further improving the voltage conversion ratio.

In some embodiments, the inductor unit further includes one or more connecting diode, each of which between two adjacent inductor modules. An anode of each connecting diode is coupled to the negative converted voltage output terminal, a cathode of each coupled diode is coupled to the positive converted output terminal.

Figure 6A:
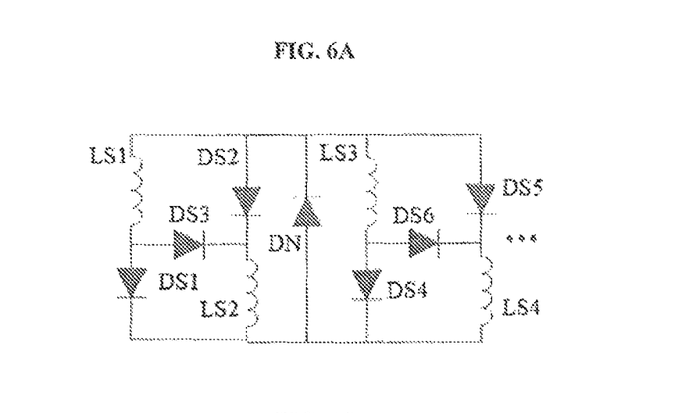
FIG. 6A is a diagram illustrating the structure of an inductor unit in a DC converter in some embodiments.

FIG. 6A is a diagram illustrating the structure of an inductor unit in a DC converter in some embodiments. Referring to FIG. 6A, the inductor unit in the embodiment includes a first inductor unit and a second inductor unit. The first inductor unit includes a first switchable inductor LS1, a second switchable inductor LS2, a first switching diode DS1, a second switching diode DS2, and a third switching diode DS3. The second inductor unit includes a third switchable inductor LS3, a fourth switchable inductor LS4, a fourth switching diode DS4, a fifth switching diode DS5, and a sixth switching diode DS6.

The inductor unit includes a connecting diode DN between the first inductor module and the second inductor module.

Optionally, DS1, DS2, DS3, DS4, DS5, DS6, and DN are part of the controller.

An anode of each connecting diode DN is coupled to the negative converted voltage output terminal, a cathode of each coupled diode DN is coupled to the positive converted output terminal.

Figure 6B:
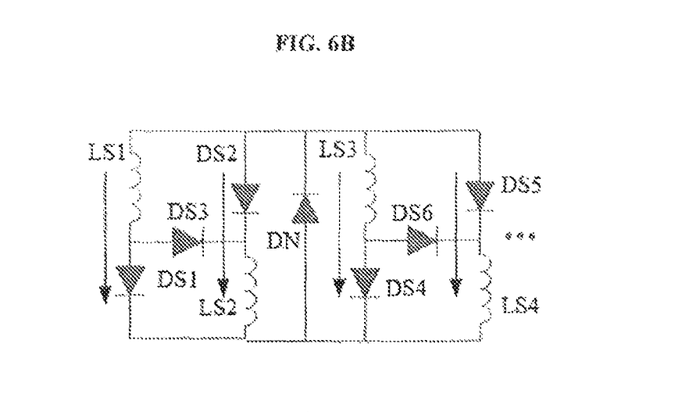
FIG. 6B illustrates the current direction when the inductor unit of FIG. 5A is being charged.

FIG. 6B illustrates the current direction when the inductor unit of FIG. 5A is being charged. Referring to FIG. 6B, when the first switch and the second switch are both turned on, LS1 and LS2 are coupled in parallel to each other. The first current path flows through LS1 and DS1 coupled in series, and the second current path flows through DS2 and LS2 coupled in series, the third current path flows through LS3 and DS4 coupled in series, and the fourth current path flows through LS4 and DS5 coupled in series. LS1, LS2, LS3, and LS4 are coupled in parallel. The DC voltage source provides a DC voltage for charging LS1, LS2, LS3, and LS4.

Figure 6C:
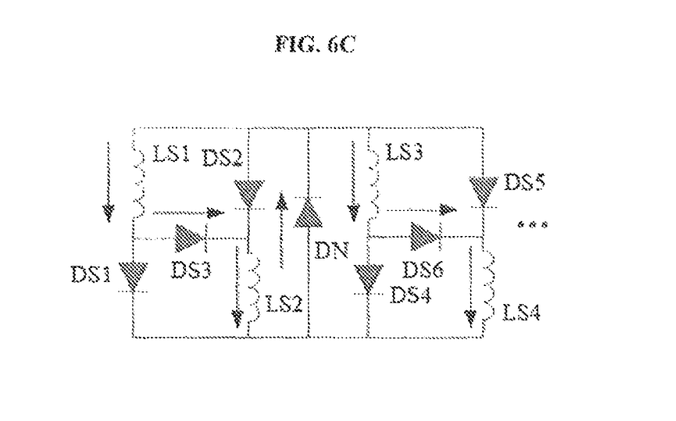
FIG. 6C illustrates the current direction when the inductor unit of FIG. 5A is being discharged.

FIG. 6C illustrates the current direction when the inductor unit of FIG. 5A is being discharged. Referring to FIG. 6C, when one of the first switch and the second switch is turned on and the other is turned off (e.g., when the first switch is turned on and the second switch is turned off, or when the second switch is turned on and the first switch is turned off), the current path sequentially flows through LS1, DS3, LS2, DN, LS3, DS6, and LS4. LS1, LS2, LS3, and LS4 are coupled in series. The discharging voltage between two terminals of each switchable inductors is approximately ¼ of that in a conventional DC converter, the discharging current is approximately ¼ of that in the conventional DC converter. The lower discharging rate results in a higher conversion gain. Optionally, the inductor unit includes N inductor modules (N is an integer≥2), the discharging current passing through each switchable inductor is approximately 1/(M*N) of that in a conventional DC converter. M is the total number of switchable inductors in each inductor module. Optionally, the inductor unit includes N inductor modules (N is an integer≥2), each of N inductor modules includes 2 switchable inductors, M=2; the discharging current passing through each switchable inductor is approximately ½N of that in a conventional DC converter.

Figure 7A:
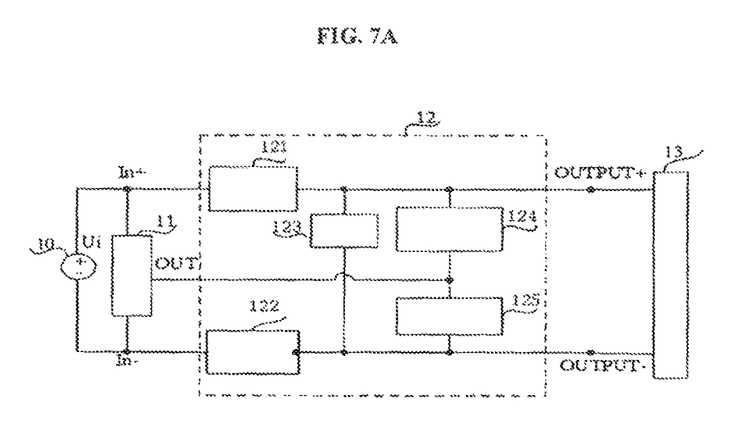
FIG. 7A is a diagram illustrating the structure of a DC converter in some embodiments.

FIG. 7A is a diagram illustrating the structure of a DC converter in some embodiments. Referring to FIG. 7A, the inductor unit in the embodiment further includes a filter circuit 13 for filtering converted voltage between the positive convened voltage output terminal OUTPUT+ and the negative converted voltage output terminal OUTPUT-. A first terminal of the filter circuit 13 is coupled to the positive converted voltage output terminal OUTPUT+, a second terminal of the filter circuit is coupled to the negative converted voltage output terminal OUTPUT-.

Figure 7B:
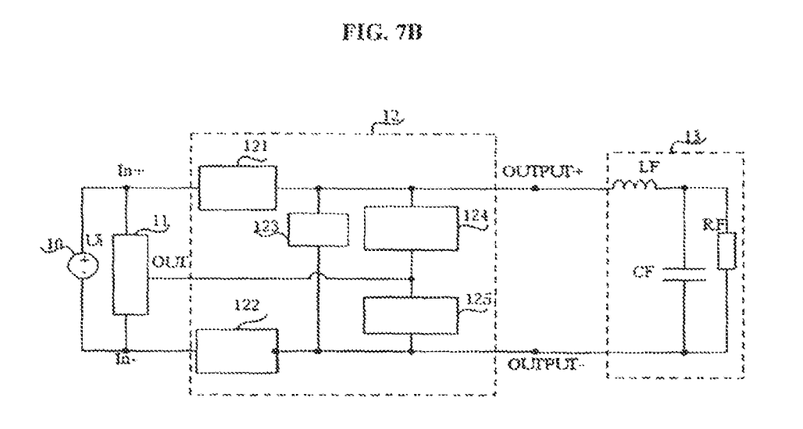
FIG. 7B is a diagram illustrating the structure of a DC converter in some embodiments.

FIG. 7B is a diagram illustrating the structure of a DC converter in some embodiments. Referring to FIG. 7B, the filter circuit 13 includes a filter inductor LF, a first filter capacitor CF1, and a filter resistor RF.

A first terminal of the filter inductor LF is coupled to the positive converted voltage output terminal OUTPUT+, and a second terminal of the filter inductor LF is coupled to a first terminal of the filter resistor RF.

A second terminal of the filter resistor RF is coupled to the negative converted voltage output terminal OUTPUT-.

A first terminal of the first filter capacitor CF1 is coupled to a second terminal of the filter inductor LF, and a second terminal of the first filter capacitor CF1 is coupled to the negative converted voltage output terminal OUTPUT-.

In some embodiments, the filter circuit further includes a second filter capacitor and a third filter capacitor.

A first terminal of the second filter capacitor is coupled to a first terminal of the inductor unit (i.e., the terminal of the inductor unit coupled to the first switch). A second terminal of the second filter capacitor is coupled to the positive converted voltage output terminal.

A first terminal of the third filter capacitor is coupled to a second terminal of the inductor unit (i.e., the terminal of the inductor unit coupled to the second switch). A second terminal of the third filter capacitor is coupled to the negative converted voltage output terminal.

In some embodiments, the voltage divider includes a first voltage division capacitor and a second voltage division capacitor.

A first terminal of the first voltage division capacitor is coupled to the positive DC voltage input terminal. A second terminal of the first voltage division capacitor is coupled to the divided voltage output terminal.

A first terminal of the second voltage division capacitor is coupled to the divided voltage output terminal. A second terminal of the second voltage division capacitor is coupled to the negative DC voltage input terminal.

In some embodiments, the first voltage division capacitor and the second voltage division capacitor have a substantially the same capacitance. The voltage divider divides the DC voltage Ui provided by a DC voltage source. The voltage at the divided voltage output terminal OUT is approximately ½ of Ui.

Figure 8:
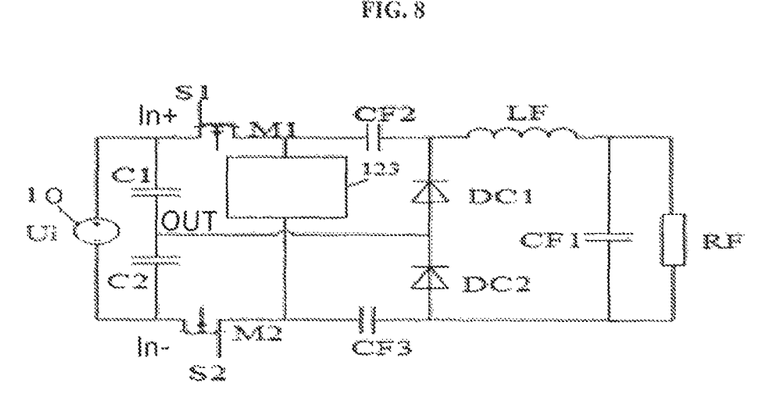
FIG. 8 is a diagram illustrating the structure of a DC converter in some embodiments.

FIG. 8 is a diagram illustrating the structure of a DC converter in some embodiments. Referring to FIG. 8, the DC converter in the embodiment includes a voltage divider, a conversion circuit, and a filter circuit.

The voltage divider includes a positive DC voltage input terminal In+, a negative DC voltage input terminal In_, and a divided voltage output terminal OUT.

The conversion circuit includes a first switch, a second switch, an inductor unit 123, a first unidirectional conductor, and a second unidirectional conductor.

The inductor unit 123 may have a structure as shown in FIG. 6A.

The voltage divider divides the DC voltage Ui provided by a DC voltage source 10.

The voltage divider includes a first voltage division capacitor C1 and a second voltage division capacitor C2.

The first terminal of the first voltage division capacitor C1 is coupled to the positive DC voltage input terminal In+. The second terminal of the first voltage division capacitor C1 is coupled to the divided voltage output terminal OUT.

The first terminal of the second voltage division capacitor C2 is coupled to the divided voltage output terminal OUT. The second terminal of the second voltage division capacitor C2 is coupled to the negative DC voltage input terminal In-.

The first switch includes a first switching transistor M1, the gate node of which is configured to receive the first switching control signal S1. The first node of the first switching transistor M1 is coupled to In+. The second node of the first switching transistor M1 is coupled to the first terminal of the inductor unit 123 (i.e., the first terminal of LS1 in FIG. 6A).

The second switch includes a second switching transistor M2, the gate node of which is configured to receive a second switching control signal S2. The first node of the second switching transistor M2 is coupled to In-. The second node of the second switching transistor is coupled to the second terminal of the inductor unit 123 (i.e., the second terminal of LS2 in FIG. 6A).

An exemplary waveform diagram of S1 and S2 signals in some embodiments is shown in FIG. 3.

The filter circuit includes a filter inductor LF, a first filter capacitor CF1, a filter resistor RF, a second filter capacitor CF2, and a third filter capacitor CF3.

The first terminal of CF2 is coupled to the second node of M1. The first terminal of CF3 is coupled to the second node of M2.

The first unidirectional conductor includes a first clamping diode DC1. The second unidirectional conductor includes a second clamping diode DC2.

The anode of DC1 is coupled to OUT. The cathode of DC1 is coupled to the second terminal of CF2.

The anode of DC2 is coupled to the second terminal of CF3. The cathode of DC2 is coupled to OUT.

The first terminal of LF is coupled to the cathode of DC1. The second terminal of LF is coupled to the first terminal of RF.

The first terminal of CF3 is coupled to the first terminal if RF. The second terminal of CF3 is coupled to the second terminal of RF.

The second terminal of RF is further coupled to the anode of DC2. The voltage between two terminals of RF is an output voltage of the DC converter.

When both M1 and M2 are turned on, the DC voltage converter provides a voltage Ui for charging LS1, LS2, LS3, and LS4. LS1, LS2, LS3, and LS4 are coupled in parallel to each other.

When M1 is turned on and M2 is turned off, the inductor unit 123 is discharged. The discharging current sequentially passes through M1, LS1, LS2, LS3, LS4, CF2, DC2, and C1. LS1, LS2, LS3, and LS4 are coupled in series.

When M2 is turned on and M1 is turned off, the inductor unit 123 is discharged. The discharging current sequentially passes through C2, DC1, CF2, LS1, LS2, LS3, LS4, and M2. LS1, LS2, LS3, and LS4 are coupled in series.

During the discharging mode, the discharging voltage between two terminals of each switchable inductors is approximately Ui/4. Thus, the discharging rate is lower than that in the conventional DC converter, and the conversion gain is higher than that in the conventional DC converter. Moreover, a gate voltage applied to a switching transistor M1 and M2 is smaller than that in the conventional DC converter, the switching transistor is subject to less stress during operation.

The present DC converter uses a novel topological circuit structure. By having this novel topological circuit structure, a higher voltage conversion ratio and a higher conversion gain may be achieved. At the same time, stress applied to the switching transistors in the present DC converter may be reduced. Accordingly, the present DC converter substantially obviates one or more of the problems due to limitations and disadvantages of the related art.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A direct current (DC) converter, comprising:
   a voltage divider for dividing a voltage provided by a DC voltage source, having a positive DC voltage input terminal, a negative DC voltage input terminal, and a divided voltage output terminal;
   a conversion circuit having a first switch, a second switch, an inductor unit, a first unidirectional conductor, and a second unidirectional conductor;
   a positive converted voltage output terminal; and
   a negative converted voltage output terminal;
   wherein the first switch is coupled between the positive DC voltage input terminal and the positive converted voltage output terminal; the second switch is coupled between the negative DC voltage input terminal and the negative converted voltage output terminal;
   the first unidirectional conductor is coupled between the divided voltage output terminal and the positive converted voltage output terminal; the second unidirectional conductor is coupled between the divided voltage output terminal and the negative converted voltage output terminal;
   the inductor unit is coupled between the positive converted voltage output terminal and the negative converted voltage output terminal; the inductor unit comprises a controller and at least two switchable inductors; and
   the controller is configured to control the at least two switchable inductors to be coupled in parallel to each other between the positive converted voltage output terminal and the negative converted voltage output terminal upon the first switch and the second switch are both turned on; and configured to control the at least two switchable inductors to be coupled in series between the positive converted voltage output terminal and the negative converted voltage output terminal upon one of the first switch and the second switch is turned on and the other is turned off;
   wherein the inductor unit comprises at least two inductor modules coupled in parallel to each other, and one or more connecting diode, each of which between two adjacent inductor modules; and
   an anode of each connecting diode is coupled to the negative converted voltage output terminal, a cathode of each coupled diode is coupled to the positive converted voltage output terminal.

2. The DC converter of claim 1, wherein a control terminal of the first switch is configured to receive a first switch control signal, and a control terminal of the second switch is configured to receive a second switch control signal; the first switch control signal and the second switch control signal having a substantially the same duty cycle and a substantially the same frequency; the first switch control signal and the second switch control signal are out of phase by approximately 180 degree to each other; and duty cycles of the first switch control signal and the second switch control signal are larger than 0.5.

3. The DC converter of claim 2, wherein the first unidirectional conductor is configured to direct a current from the divided voltage output terminal to the positive converted voltage output terminal; and the second unidirectional conductor is configured to direct a current from the negative converted voltage output terminal to the divided voltage output terminal.

4. The DC converter of claim 3, wherein the first unidirectional conductor comprises a first clamping diode having an anode coupled to the divided voltage output terminal and a cathode coupled to the positive converted voltage output terminal; and the second unidirectional conductor comprises a second clamping diode having an anode coupled to the negative converted voltage output terminal and a cathode coupled to the divided voltage output terminal.

5. A direct current (DC) converter, comprising:
a voltage divider for dividing a voltage provided by a DC voltage source, having a positive DC voltage input terminal, a negative DC voltage input terminal, and a divided voltage output terminal;
a conversion circuit having a first switch, a second switch, an inductor unit, a first unidirectional conductor, and a second unidirectional conductor;
a positive converted voltage output terminal; and
a negative converted voltage output terminal;
wherein the first switch is coupled between the positive DC voltage input terminal and the positive converted voltage output terminal; the second switch is coupled between the negative DC voltage input terminal and the negative converted voltage output terminal;
the first unidirectional conductor is coupled between the divided voltage output terminal and the positive converted voltage output terminal; the second unidirectional conductor is coupled between the divided voltage output terminal and the negative converted voltage output terminal;
the inductor unit is coupled between the positive converted voltage output terminal and the negative converted voltage output terminal; the inductor unit comprises a controller and at least two switchable inductors;
the controller is configured to control the at least two switchable inductors to be coupled in parallel to each other between the positive converted voltage output terminal and the negative converted voltage output terminal upon the first switch and the second switch are both turned on; and configured to control the at least two switchable inductors to be coupled in series between the positive converted voltage output terminal and the negative converted voltage output terminal upon one of the first switch and the second switch is turned on and the other is turned off;
wherein the inductor unit comprises an inductor module having a first switchable inductor, a second switchable inductor, a first switching diode, a second switching diode, and a third switching diode;

a first terminal of the first switchable inductor is coupled to the positive converted voltage output terminal, a second terminal of the first switchable inductor is coupled to an anode of the first switching diode;
a cathode of the first switching diode is coupled to the negative converted voltage output terminal;
an anode of the second switching diode is coupled to the positive converted voltage output terminal, a cathode of the second switching diode is coupled to a first terminal of the second switchable inductor;
a second terminal of the second switchable inductor is coupled to the negative converted voltage output terminal; and
an anode of the third switching diode is coupled to an anode of the first switching diode, a cathode of the third switching diode is coupled to a cathode of the second switching diode.

6. The DC converter of claim 5, wherein the inductor unit comprises at least two inductor modules coupled in parallel to each other, and one or more connecting diode, each of which between two adjacent inductor modules; and
an anode of each connecting diode is coupled to the negative converted voltage output terminal, a cathode of each coupled diode is coupled to the positive converted voltage output terminal.

7. The DC converter of claim 1, further comprising a filter circuit configured to filter converted voltage between the positive converted voltage output terminal and the negative converted voltage output terminal;
wherein a first terminal of the filter circuit is coupled to the positive converted voltage output terminal, a second terminal of the filter circuit is coupled to the negative converted voltage output terminal.

8. The DC converter of claim 7, wherein the filter circuit comprises a filter inductor, a first filter capacitor, and a filter resistor;
a first terminal of the filter inductor is coupled to the positive converted voltage output terminal, and a second terminal of the filter inductor is coupled to a first terminal of the filter resistor;
a second terminal of the filter resistor is coupled to the negative converted voltage output terminal; and
a first terminal of the first filter capacitor is coupled to a second terminal of the filter inductor, and a second terminal of the first filter capacitor is coupled to the negative converted voltage output terminal.

9. The DC converter of claim 8, wherein the filter circuit further comprises a second filter capacitor and a third filter capacitor;
a first terminal of the second filter capacitor is coupled to a first terminal of the inductor unit, and a second terminal of the second filter capacitor is coupled to the positive converted voltage output terminal; and
a first terminal of the third filter capacitor is coupled to a second terminal of the inductor unit, and a second terminal of the third filter capacitor is coupled to the negative converted voltage output terminal.

10. The DC converter of claim 9, wherein the voltage divider comprises a first voltage division capacitor and a second voltage division capacitor;
a first terminal of the first voltage division capacitor is coupled to the positive DC voltage input terminal, and a second terminal of the first voltage division capacitor is coupled to the divided voltage output terminal; and
a first terminal of the second voltage division capacitor is coupled to the divided voltage output terminal, and a second terminal of the second voltage division capacitor is coupled to the negative DC voltage input terminal.

11. The DC converter of claim 10, wherein the first voltage division capacitor and the second voltage division capacitor have a substantially the same capacitance.

12. The DC converter of claim 5, wherein a control terminal of the first switch is configured to receive a first switch control signal, and a control terminal of the second switch is configured to receive a second switch control signal; the first switch control signal and the second switch control signal having a substantially the same duty cycle and a substantially the same frequency; the first switch control signal and the second switch control signal are out of phase by approximately 180 degree to each other; and duty cycles of the first switch control signal and the second switch control signal are larger than 0.5.

13. The DC converter of claim 12, wherein the first unidirectional conductor is configured to direct a current from the divided voltage output terminal to the positive converted voltage output terminal; and the second unidirectional conductor is configured to direct a current from the negative converted voltage output terminal to the divided voltage output terminal.

14. The DC converter of claim 13, wherein the first unidirectional conductor comprises a first clamping diode having an anode coupled to the divided voltage output terminal and a cathode coupled to the positive converted voltage output terminal; and the second unidirectional conductor comprises a second clamping diode having an anode coupled to the negative converted voltage output terminal and a cathode coupled to the divided voltage output terminal.

15. The DC converter of claim 5, further comprising a filter circuit configured to filter converted voltage between the positive converted voltage output terminal and the negative converted voltage output terminal;
    wherein a first terminal of the filter circuit is coupled to the positive converted voltage output terminal, a second terminal of the filter circuit is coupled to the negative converted voltage output terminal.

16. The DC converter of claim 15, wherein the filter circuit comprises a filter inductor, a first filter capacitor, and a filter resistor;
    a first terminal of the filter inductor is coupled to the positive converted voltage output terminal, and a second terminal of the filter inductor is coupled to a first terminal of the filter resistor;
    a second terminal of the filter resistor is coupled to the negative converted voltage output terminal; and
    a first terminal of the first filter capacitor is coupled to a second terminal of the filter inductor, and a second terminal of the first filter capacitor is coupled to the negative converted voltage output terminal.

17. The DC converter of claim 16, wherein the filter circuit further comprises a second filter capacitor and a third filter capacitor;
    a first terminal of the second filter capacitor is coupled to a first terminal of the inductor unit, and a second terminal of the second filter capacitor is coupled to the positive converted voltage output terminal; and
    a first terminal of the third filter capacitor is coupled to a second terminal of the inductor unit, and a second terminal of the third filter capacitor is coupled to the negative converted voltage output terminal.

18. The DC converter of claim 17, wherein the voltage divider comprises a first voltage division capacitor and a second voltage division capacitor;
    a first terminal of the first voltage division capacitor is coupled to the positive DC voltage input terminal, and a second terminal of the first voltage division capacitor is coupled to the divided voltage output terminal; and
    a first terminal of the second voltage division capacitor is coupled to the divided voltage output terminal, and a second terminal of the second voltage division capacitor is coupled to the negative DC voltage input terminal.

19. The DC converter of claim 18, wherein the first voltage division capacitor and the second voltage division capacitor have a substantially the same capacitance.

* * * * *